(12) United States Patent
Lu et al.

(10) Patent No.: US 11,451,106 B2
(45) Date of Patent: Sep. 20, 2022

(54) MOTOR

(71) Applicant: Delta Electronics, Inc., Taoyuan (TW)

(72) Inventors: Yi-Ta Lu, Taoyuan (TW); Wei-Ming Lai, Taoyuan (TW); Yun-Hung Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 43 days.

(21) Appl. No.: 16/905,495

(22) Filed: Jun. 18, 2020

(65) Prior Publication Data

US 2020/0403472 A1 Dec. 24, 2020

Related U.S. Application Data

(60) Provisional application No. 62/863,403, filed on Jun. 19, 2019.

(30) Foreign Application Priority Data

Jun. 5, 2020 (CN) .......................... 202010507329.2

(51) Int. Cl.
*H02K 5/10* (2006.01)
*H02K 1/32* (2006.01)
*H02K 5/22* (2006.01)
*H02K 5/18* (2006.01)

(52) U.S. Cl.
CPC .................. *H02K 5/10* (2013.01); *H02K 1/32* (2013.01); *H02K 5/18* (2013.01); *H02K 5/22* (2013.01); *H02K 2203/03* (2013.01)

(58) Field of Classification Search
CPC ............... H02K 5/15; H02K 1/32; H02K 9/06
USPC ........................................ 310/40 R, 60 R, 63
See application file for complete search history.

(56) References Cited

U.S. PATENT DOCUMENTS

| 6,384,494 | B1 | 5/2002 | Avidano et al. |
| 8,531,065 | B2 | 9/2013 | Knorr et al. |
| 8,810,086 | B2 | 8/2014 | Best et al. |
| 9,621,010 | B2 | 4/2017 | Stillger et al. |
| D795,807 | S * | 8/2017 | Shinosaka ..................... D13/122 |
| 9,806,567 | B2 | 10/2017 | Lee et al. |

(Continued)

FOREIGN PATENT DOCUMENTS

| CN | 102104309 A | 6/2011 | |
| DE | 10313273 A1 | 10/2004 | |
| EP | 2242344 A1 * | 10/2010 | ............. H02K 11/33 |

*Primary Examiner* — Jose A Gonzalez Quinones
(74) *Attorney, Agent, or Firm* — Kirton McConkie; Evan R. Witt

(57) ABSTRACT

The present disclosure provides a motor including a base, a stator and a rotor. The stator is disposed on the base. The base includes a cylinder. There is a flange disposed on a side of the cylinder neighboring to the rotor. Fins are axially disposed on the flange, and the periphery of the flange has a breach. The breach is partially extended to the cylinder, and there is also a plurality of fins disposed in the breach. A plurality of air-guiding members are annularly disposed on the periphery of the rotor. The air-guiding members are connected to each other through a connecting rim. The fins on the flange and the air-guiding members of the rotor are both extended axially, thus the interference therebetween is avoided. When the motor rotates, the air-guiding members are able to drive the flow passing through the breach for achieving heat-dissipating effect.

16 Claims, 9 Drawing Sheets

(56) References Cited

U.S. PATENT DOCUMENTS

| | | | |
|---|---|---|---|
| 10,454,328 B2 | 10/2019 | Shiraki et al. | |
| D881,128 S * | 4/2020 | Fries | D13/122 |
| 2011/0148230 A1* | 6/2011 | Knorr | H02K 1/2786 |
| | | | 310/62 |
| 2015/0188392 A1* | 7/2015 | Haag | H02K 5/18 |
| | | | 310/59 |
| 2016/0197531 A1* | 7/2016 | Chiou | H02K 5/225 |
| | | | 310/71 |
| 2016/0344261 A1 | 11/2016 | Yen | |
| 2018/0123428 A1* | 5/2018 | Sturm | H02K 9/08 |

* cited by examiner

MOTOR

CROSS-REFERENCE TO RELATED APPLICATION

This application claims the benefit of U.S. Provisional Application No. 62/863,403 filed on Jun. 19, 2019, entitled "FAN". This application claims priority to China Patent Application No. 202010507329.2 filed on Jun. 5, 2020. The entire contents of the above-mentioned patent applications are incorporated herein by reference for all purposes.

FIELD OF THE INVENTION

The present disclosure relates to a motor, and more particularly to a motor having air-guiding members and fins.

BACKGROUND OF THE INVENTION

In conventional motors, in order to increase heat dissipation, the air-guiding plate is installed to the open end of the rotor. Accordingly, when the rotor rotates, the air flow driven by the air-guiding plate is utilized for enhancing the heat dissipation. However, there may have positional error during installing the additional air-guiding plate, which causes interference and friction when the rotor rotates. Moreover, after the motor is installed, the problem of poor heat dissipation often occurs if a side of the installation position is in an enclosed space.

Therefore, there is a need of providing a motor to obviate the drawbacks encountered from the prior arts.

SUMMARY OF THE INVENTION

It is an objective of the present disclosure to provide a motor including a stator and a rotor. The stator includes a base and at least a coil disposed on the base, and the rotor is sleeved on the stator. The base includes a cylinder and a flange, and the flange is disposed on a side of the cylinder neighboring to the rotor. The flange includes a plurality of fins. A breach is disposed on the periphery of the flange, and is partially extended to the cylinder. There is also a plurality of fins disposed in the breach.

In accordance with an embodiment of the present disclosure, for the motor with the features described above, a plurality of air-guiding members are disposed on the outer periphery of the rotor. The plurality of air-guiding members are connected to each other through a connecting rim. A through hole is formed among two adjacent air-guiding members and the connecting rim.

In accordance with an embodiment of the present disclosure, for the motor with the features described above, the extension direction of the fin of the flange and that of the air-guiding member of the rotor are the same. When the rotor rotates, the interference between the air-guiding member and the fin of the flange is avoided.

In accordance with an embodiment of the present disclosure, for the motor with the features described above, the air-guiding member can drive the air flow passing through the breach to achieve the heat-dissipating effect when the motor rotates.

In accordance with an embodiment of the present disclosure, for the motor with the features described above, the air-guiding member can drive the air flow passing through the through hole to achieve the heat-dissipating effect when the motor rotates.

In accordance with an embodiment of the present disclosure, for the motor with the features described above, the air-guiding member can drive the air flow passing through the plurality of fins of the flange to achieve the heat-dissipating effect when the motor rotates.

The motor with the features described above is an external rotor motor.

In accordance with an embodiment of the present disclosure, the motor with the features described above includes a stator and a rotor. The stator includes a base and at least a coil disposed on the base, and the rotor is sleeved on the stator to rotate along a shaft. Further, a fan wheel may be disposed on the rotor, and the fan wheel is driven by the rotor to rotate.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
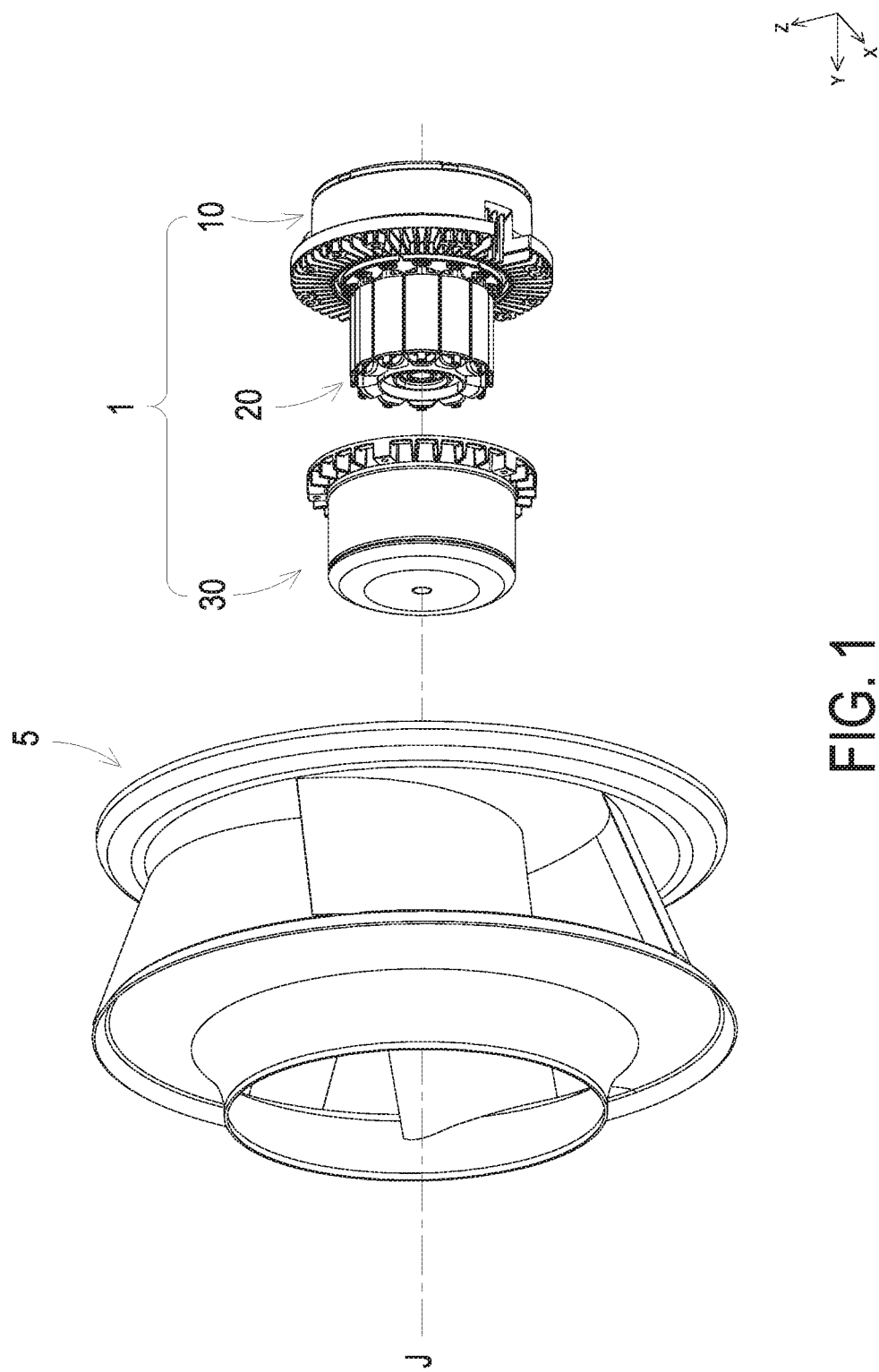
FIG. 1 is a schematic exploded view illustrating a motor and a fan wheel according to an embodiment of the present disclosure.

Please refer to FIG. 1. FIG. 1 is a schematic exploded view illustrating a motor 1 and a fan wheel 5 according to an embodiment of the present disclosure. As shown in FIG. 1, the motor 1 includes a stator 20 and a rotor 30. The stator 20 includes a base 10 and at least a coil 21 mounted on the base 10. The rotor 30 is sleeved on the stator 20 along an axis J, thus the rotor 30 can rotate along the axis J. Further, a fan wheel 5 is sleeved on the exterior of the rotor 30, and the rotor 30 can drive the fan wheel 5 to rotate along the axis J synchronously.

Figure 2:
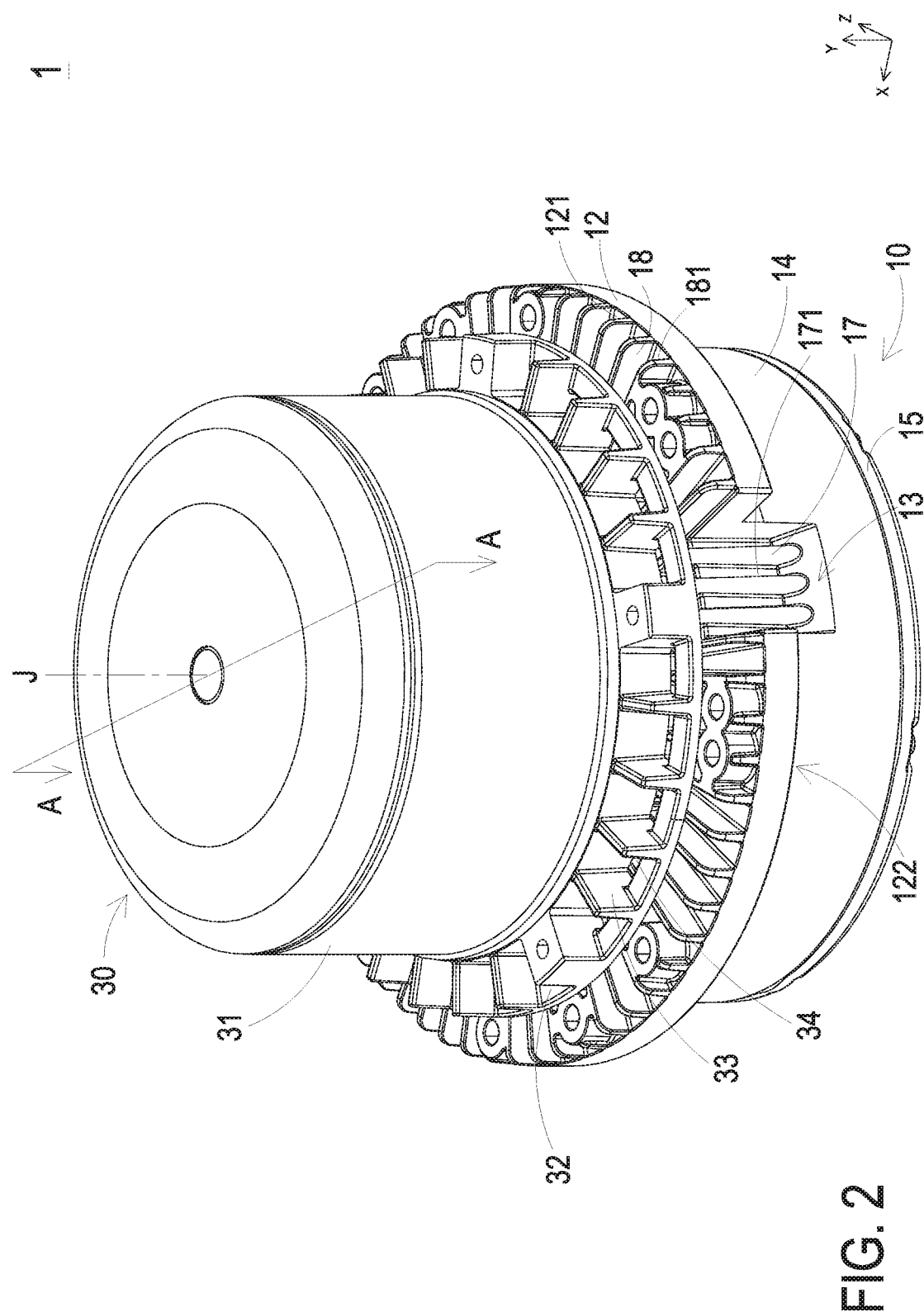
FIG. 2 is a schematic perspective view illustrating a motor according to an embodiment of the present disclosure.

Please refer to FIG. 2. FIG. 2 is a schematic perspective view illustrating a motor 1 according to an embodiment of the present disclosure. The base 10 of the motor 1 includes a flange 12 and a cylinder 14. The flange 12 is disposed on a side of the cylinder 14 neighboring to the rotor 30. A plate 15 is disposed on a side of the cylinder 14 away from the rotor 30. The outer diameter of the flange 12 is substantially larger than the outer diameter of the cylinder 14. A breach 13 is disposed on the periphery of the flange 12, and the breach 13 is extended to the cylinder 14 toward the direction away from the rotor 30 substantially. A plurality of first fins 17 are disposed in the breach 13, and a first gap 171 is formed between any two adjacent first fins 17.

The flange 12 may be defined as including a first surface 121 facing the rotor 30 and a second surface 122 opposite to the first surface 121. A plurality of second fins 18 are convexly disposed on the first surface 121 and are extended toward the direction away from the axis J. A second gap 181 is formed between any two adjacent second fins 18.

Please continue referring to FIG. 2. The outer periphery of the rotor 30 includes a hub 31. The hub 31 is cylindrical and can be utilized for installing the fan wheel 5. A plurality of air-guiding members 33 are annularly disposed on a side of the hub 31 neighboring to the cylinder 14, and the air-guiding members 33 are extended toward the direction away from the axis J. The plurality of air-guiding members 33 are connected to each other through an annular connecting rim 32. Furthermore, the connecting rim 32 is disposed on a side of the air-guiding members 33 neighboring to the second fins 18 of the flange 12. A through hole 34 is formed among two adjacent air-guiding members 33 and the corresponding connecting rim 32.

The rotatable air-guiding members 33 connected with the rotor 30 are extended toward the positive direction of Y axis from the connecting rim 32. The fixed second fins 18 are extended toward the positive direction of Y axis from the flange 12. In other words, relative to the connecting rim 32 and the flange 12 respectively, the extension direction of the air-guiding members 33 and that of the second fins 18 are the same.

In this embodiment, the extension directions of the second fins 18 and that of the air-guiding members 33 are the same, and the connecting rim 32 is disposed at an end of the air-guiding members 33 neighboring to the second fins 18. Therefore, when the rotor 30 rotates, the chance of causing interference between the air-guiding member 33 and the second fin 18 is reduced.

Figure 3:
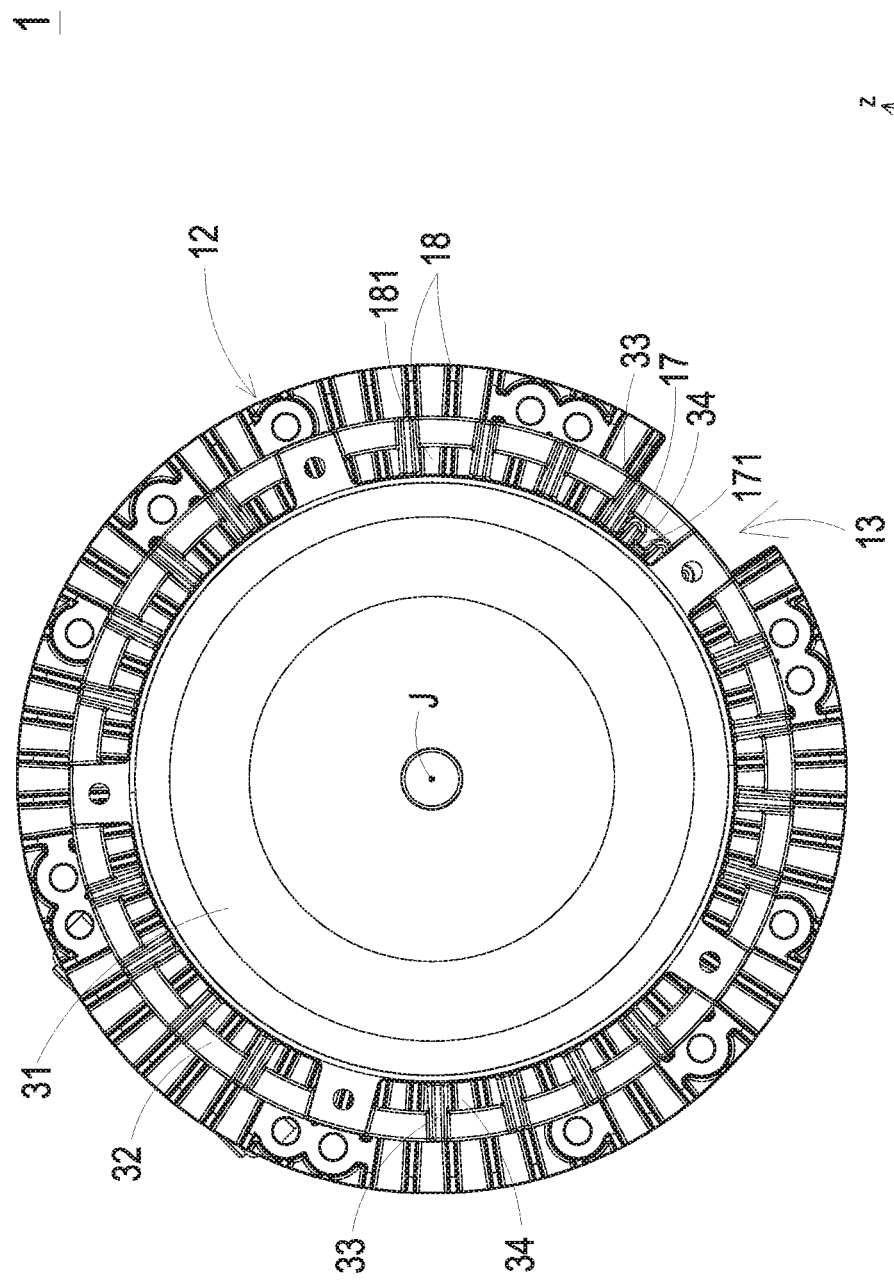
FIG. 3 is a top view of the motor of FIG. 2.

FIG. 3 is a top view of the motor 1 of FIG. 2. Please refer to FIGS. 2 and 3. The air-guiding members 33 are annularly disposed on the periphery of the hub 31, and the connecting rim 32 is disposed at the end of the air-guiding members 33. The through hole 34 is formed among two adjacent air-guiding members 33, the corresponding connecting rim 32 and the hub 31. The outer diameter of the flange 12 is larger than the that of the connecting rim 32. At the direction of the axis J, the second fins 18 of the flange 12 are extended toward the through hole 34. Namely, the second fins 18 are partially exposed at the outside of the connecting rim 32 and are partially exposed at the inside of the connecting rim 32.

Please continue referring to FIG. 3. The breach 13 is disposed on the periphery of the flange 12. The plurality of first fins 17 are disposed in the breach 13, and the first gap 171 is formed between any two adjacent first fins 17. At the direction of the axis J, at least a part of the first fins 17 is exposed in the through hole 34.

Figure 4:
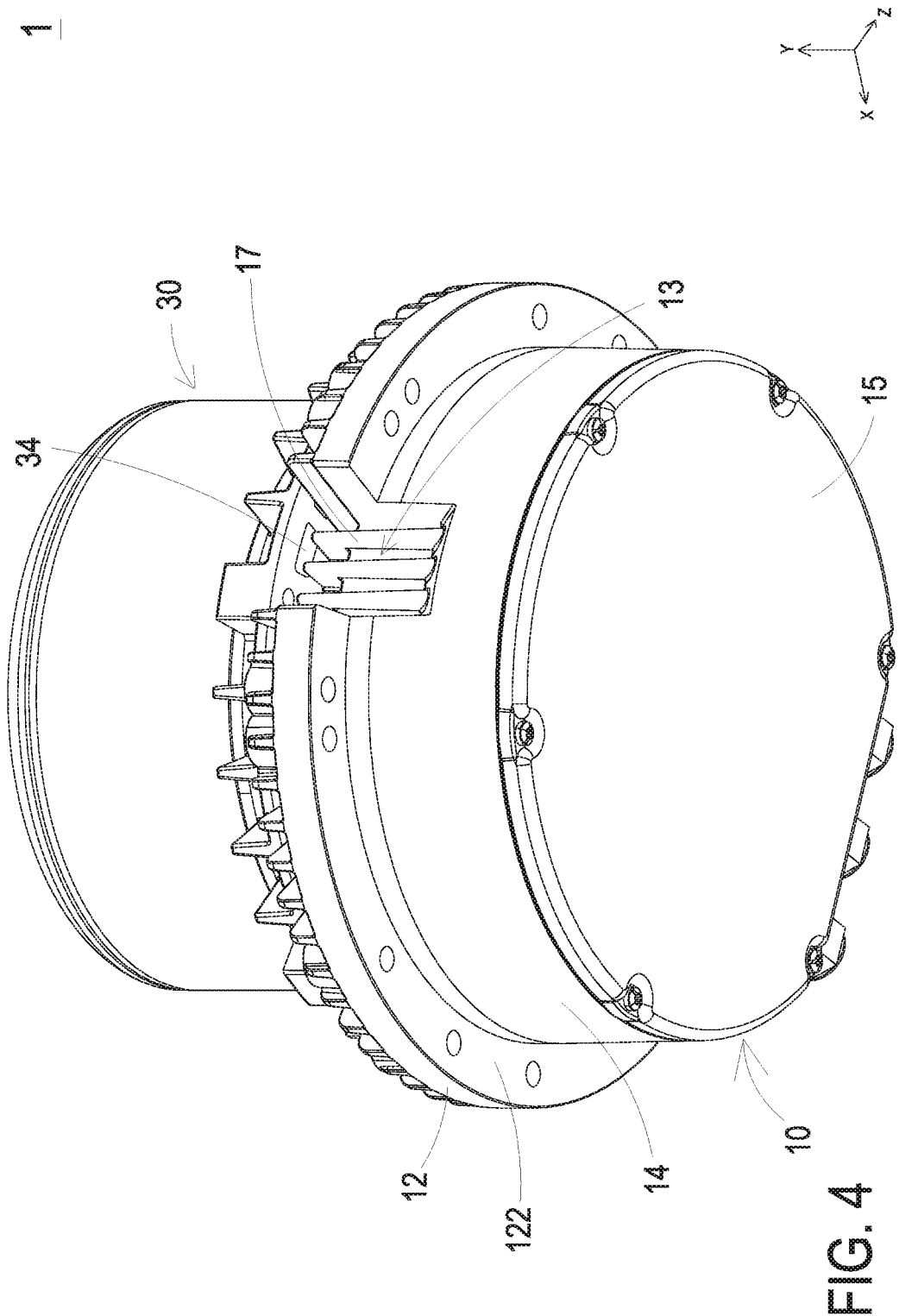
FIG. 4 is a schematic perspective view illustrating the motor of FIG. 2 at another viewing angle.

Please refer to FIG. 4. FIG. 4 is a schematic perspective view illustrating the motor 1 of FIG. 2 at another viewing angle. The second surface 122 of the flange 12 is adjacently connected to the cylinder 14 of the base 10. The breach 13 disposed on the periphery of the flange 12 is extended to the cylinder 14 toward the direction away from the rotor 30. The first fins 17 disposed in the breach 13 are also extended to the cylinder 14. The plate 15 is connected to the cylinder 14, and the flange 12 and the plate 15 are located at two opposite sides of the cylinder 14.

Figure 5:
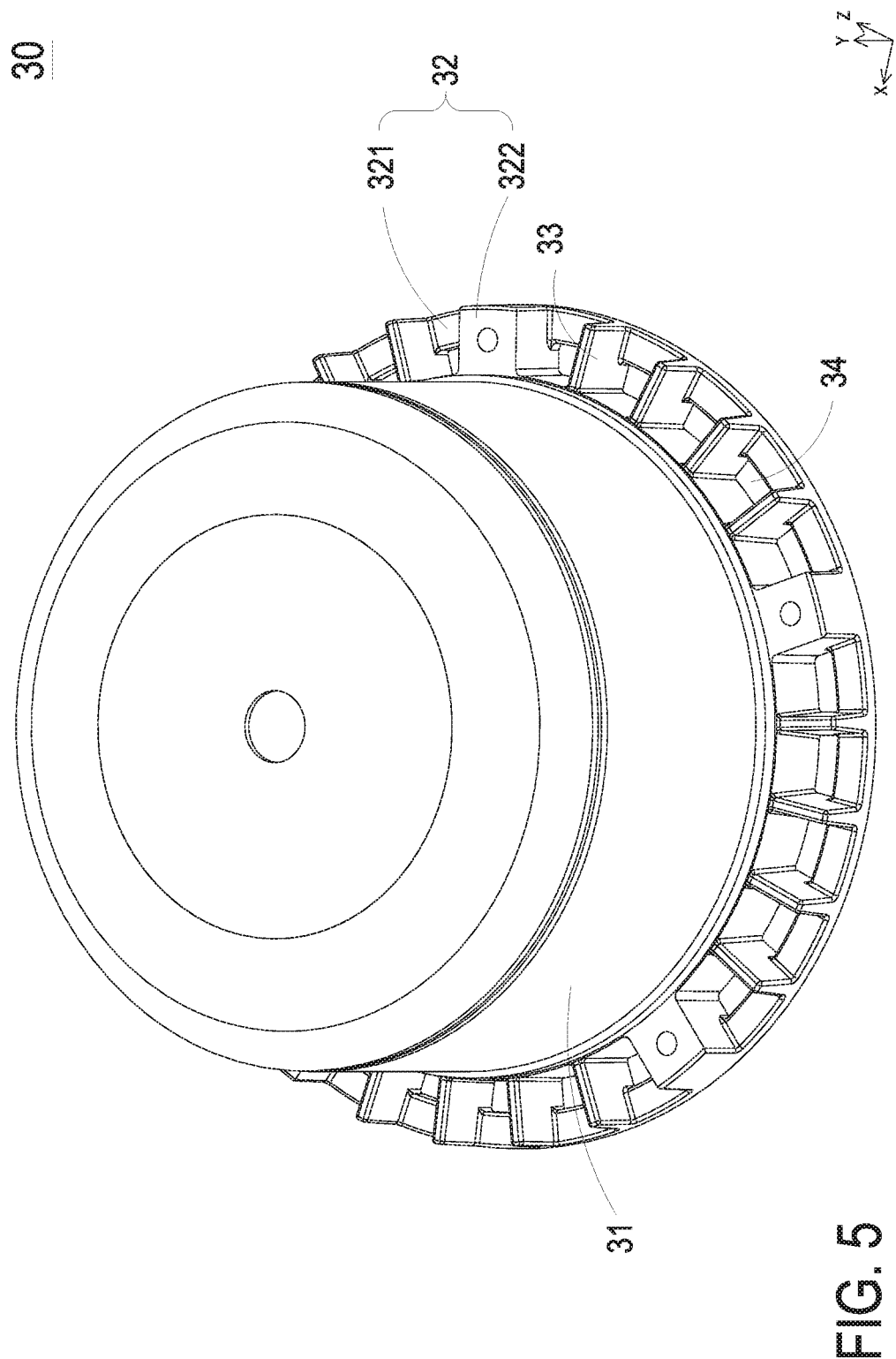
FIG. 5 is a schematic perspective view illustrating the rotor of FIG. 2.

Please refer to FIG. 5. FIG. 5 is a schematic perspective view illustrating the rotor 30 of FIG. 2. The plurality of air-guiding members 33 are disposed on the periphery of the hub 31 and are connected to each other through the connection rim 32. The connecting rim 32 includes a ring part 321 and a connecting part 322. The ring part 321 is a component configured to connect the air-guiding members 33, and the connecting part 322 is a component configured to connect the hub 31 and the ring part 321. The connecting part 322 further includes a fastening hole allowing the fan wheel 5 to be fastened to the hub 31. The through hole 34 is formed among the connecting part 322 and two adjacent air-guiding members 33. In an embodiment, the hub 31, the air-guiding members 33 and the connecting rim 32 can be a metal casting formed in one piece.

Figure 6:
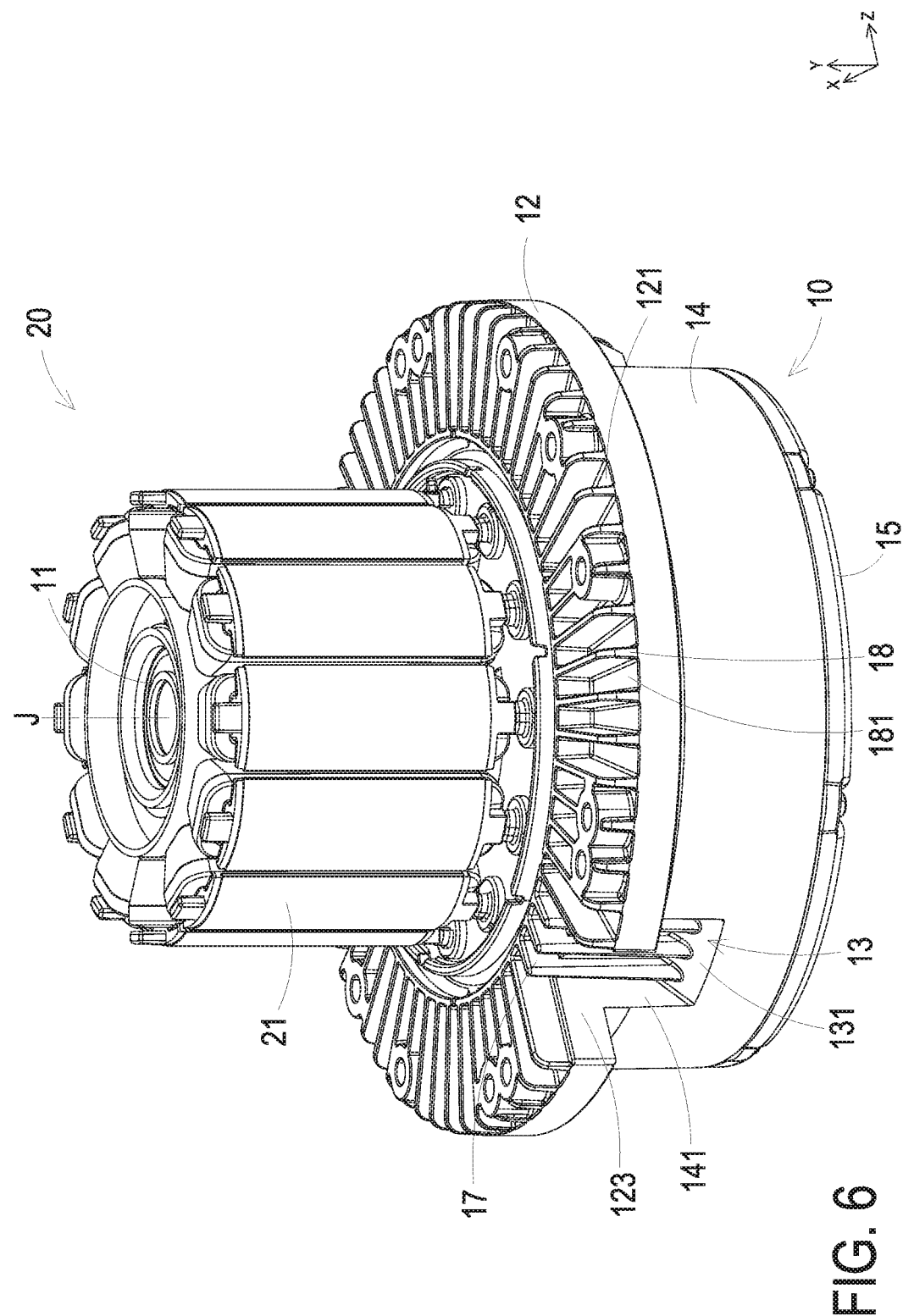
FIG. 6 is a schematic perspective view illustrating the stator and the base of FIG. 2.

Please refer to FIG. 6. FIG. 6 is a schematic perspective view illustrating the stator 20 and the base 10 of FIG. 2. The stator 20 is disposed on the base 10, and a tube 11 is disposed in the stator 20 along the axis J. The coils 21 are annularly disposed on the periphery of the tube 11. The flange 12 is disposed on a side of the cylinder 14 neighboring to the coils 21. The second fins 18 are convexly disposed on the first surface 121 of the flange 12, and the second fins 18 are extended toward the direction away from the axis J. The second gap 181 is formed between any two adjacent second fins 18. The breach 13 disposed on the periphery of the flange 12 makes the flange 12 become a discontinuous ring structure. In specific, the flange 12 forms a first recess 123 at the breach 13. The breach 13 is further extended to the cylinder 14, which causes the cylinder 14 to form a second recess 141 at the breach 13. Optionally, a slope 131 is formed at the adjacency of the breach 13 and the cylinder 14.

Figure 7:
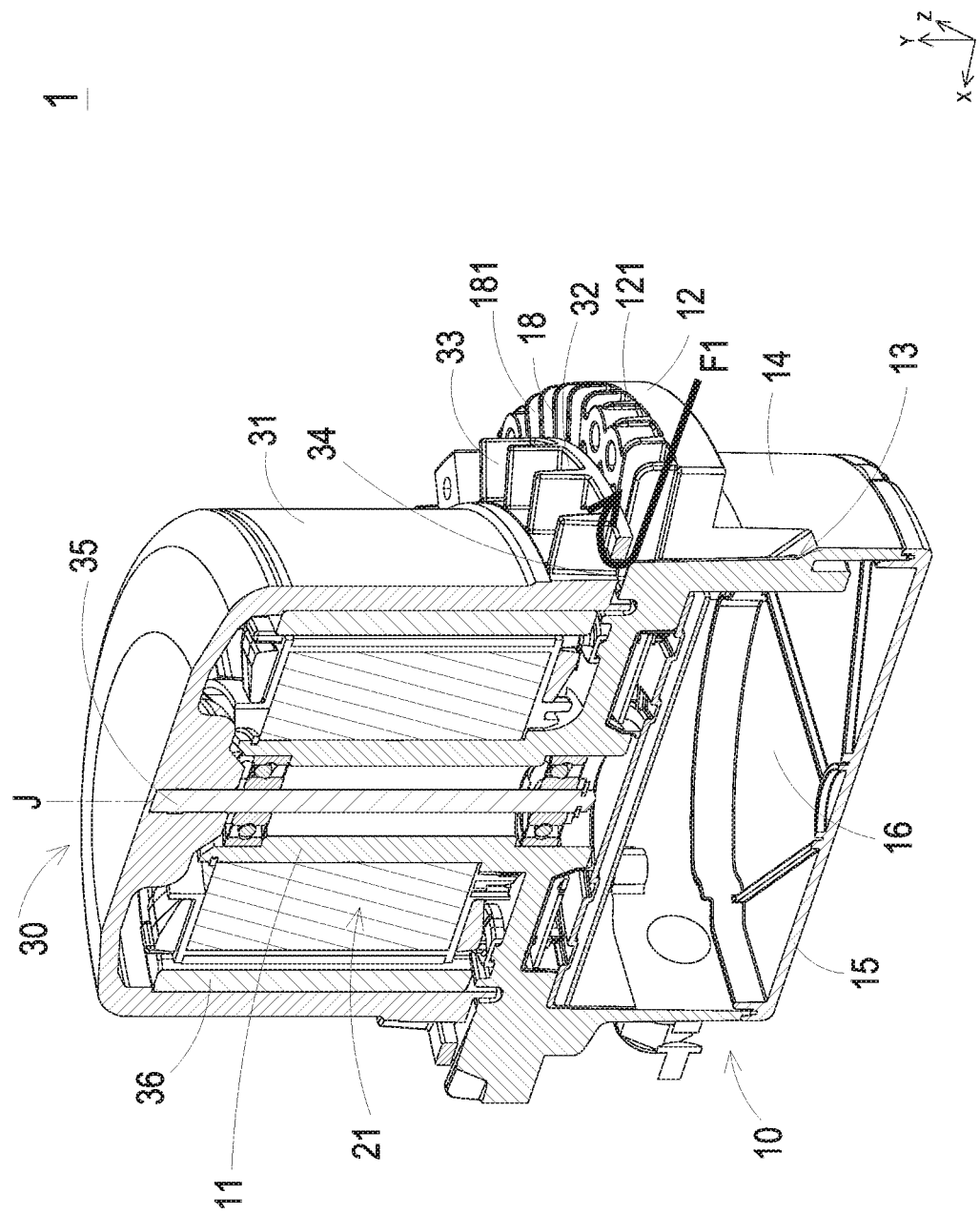
FIG. 7 is a schematic cross-sectional view showing the motor of FIG. 2 along the section AA.

FIG. 7 is a schematic cross-sectional view showing the motor 1 of FIG. 2 along the section AA. The rotor 30 includes the hub 31, a shaft 35 and magnet elements 36. The shaft 35 is disposed in the hub 31 and is inserted in the tube 11. The magnet elements 36 are disposed on the inner periphery of the hub 31 and are corresponding to the coil 21. A space 16 is formed between the interior of the cylinder 14 of the base 10 and the plate 15, and the space 16 is configured to accommodate the electronic components of the motor 1.

Please refer to FIGS. 2 and 7. When the rotor 30 rotates along the axis J, the air-guiding members 33 are driven by the rotor 30 to rotate. By experiments, it is learned that a first heat-dissipating flow F1 is generated by the rotation of the air-guiding members 33. The first heat-dissipating flow F1 passes through the through hole 34 between any two adjacent air-guiding members 33. Moreover, the first heat-dissipating flow F1 also passes through the second gap 181 between two adjacent second fins 18. When the motor 1 rotates, the heat generated by the coils 21 can be transferred to the air-guiding members 33 through the tube 11 and the hub 31, which are made of metal. In addition, the heat generated by the electronic components in the space 16 can be transferred to the second fins 18 through the cylinder 14. The second fins 18 and the air-guiding members 33, where the first heat-dissipating flow F1 passes through, are also made of metal materials. Consequently, the heat-dissipating effect is achieved.

Figure 8:
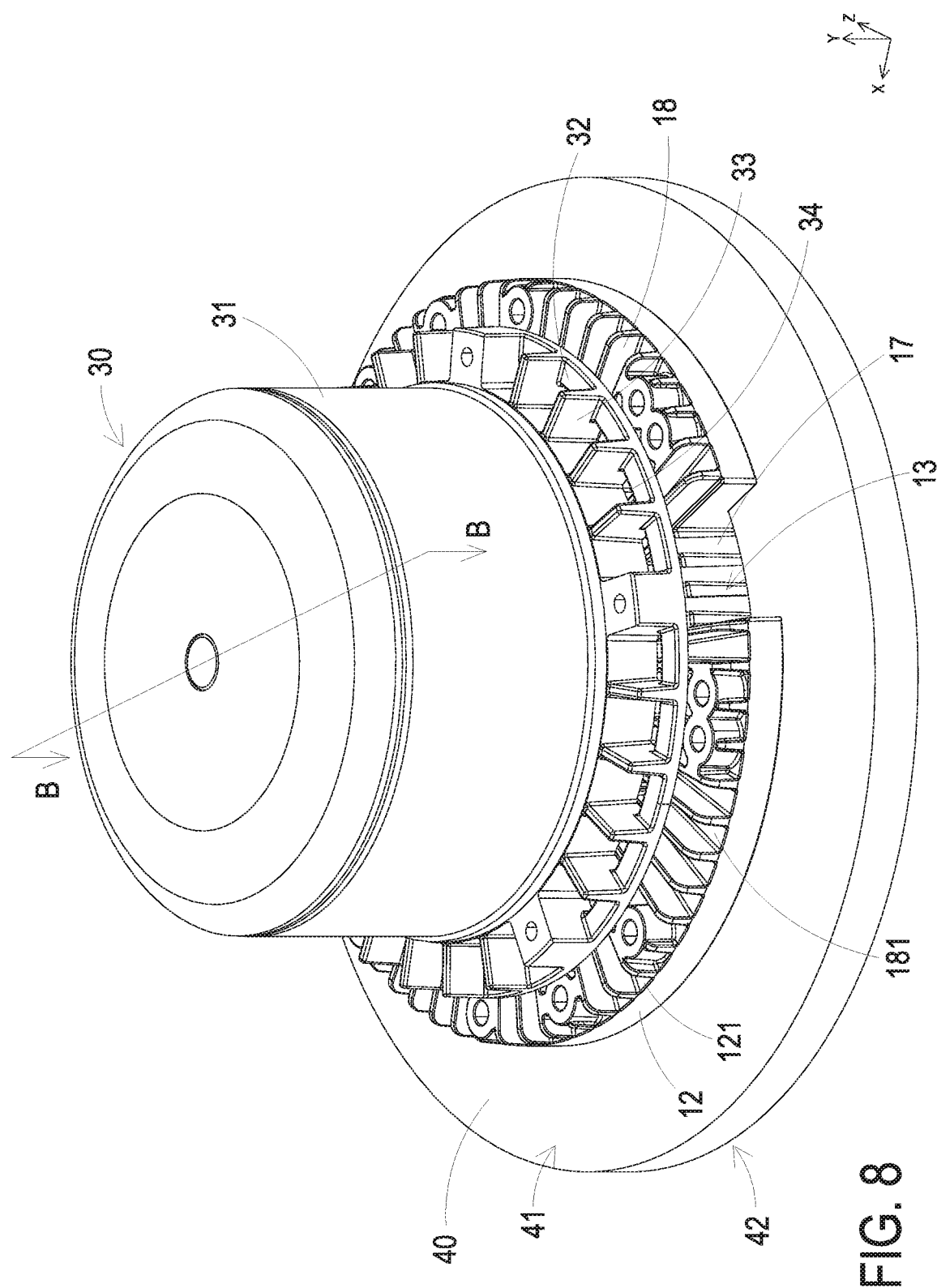
FIG. 8 is a schematic perspective view showing the motor of FIG. 2 assembled with an installation element.

Please refer to FIG. 8. FIG. 8 is a schematic perspective view showing the motor 1 of FIG. 2 assembled with an installation element 40. The installation element 40 has an opening, and the size of the opening is substantially smaller than the size of the flange 12 and large than that of the cylinder 14. The installation element 40 has a first side 41 and a second side 42 opposite to the first side 41. When the motor 1 is assembled with the installation element 40 (i.e., the cylinder 14 is located in the opening), the first side 41 of the installation element 40 is abutted against the second surface 122 of the flange 12. Therefore, the rotor 30 and the flange 12 are located at the first side 41 of the installation element 40.

Figure 9:
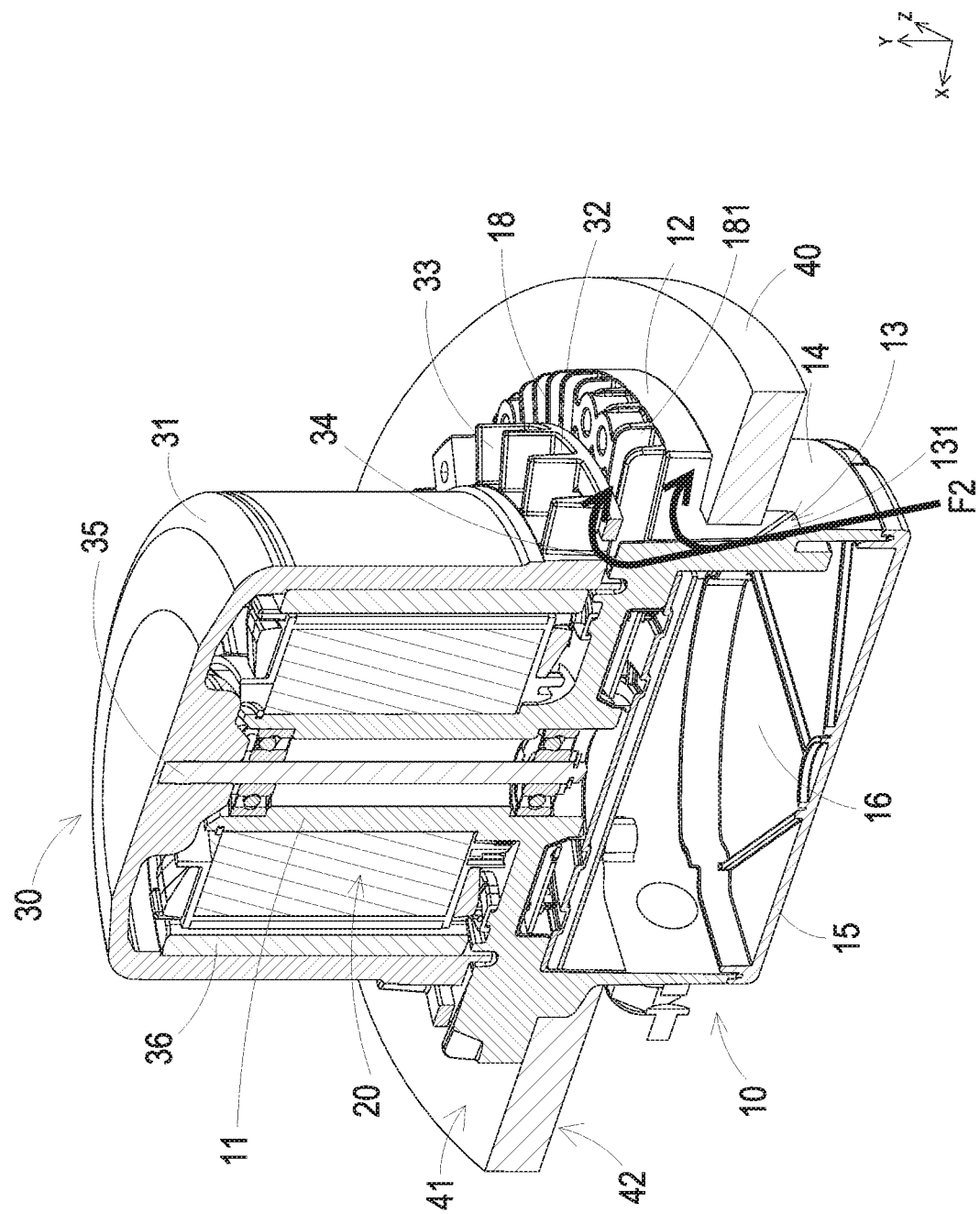
FIG. 9 is a schematic cross-sectional view showing the motor and the installation element of FIG. 8 along the section BB.

FIG. 9 is a schematic cross-sectional view showing the motor 1 and the installation element 40 of FIG. 8 along the section BB. Please refer to FIGS. 8 and 9. When the motor 1 is assembled with the installation element 40, the base 10, the plate 15 and the space 16 are located at the second side 42 opposite to the first side 41. The breach 13 disposed on the periphery of the flange 12 allows the first side 41 and the second side 42 to be in communication with each other through the breach 13. The first fins 17 in the breach 13 are exposed to the first side 41 and the second side 42 simultaneously. The heat generated by the electronic components in the space 16 is transferred to the first fins 17 through the cylinder 14. When the rotor 30 rotates along the axis J, the air-guiding members 33 are driven by the rotor 30 to rotate. By experiments, it is learned that a second heat-dissipating flow F2 is generated by the rotation of the air-guiding members 33. Via the breach 13, the second heat-dissipating flow F2 flows from the second side 42 to the first side 41 with passing through the first fins 17. Then, the second heat-dissipating flow F2 flows out of the breach 13 or passes through the through hole 34. Consequently, the heat-dissipating effect is achieved.

In an embodiment, if the second side 42 is in an enclosed space, great heat-dissipating effect would be achieved by the second heat-dissipating flow F2. In addition, the slope 131 formed at the adjacency of the breach 13 and the cylinder 14 has the effect of guiding the second heat-dissipation flow F2.

From the above descriptions, the present disclosure provides a motor. By utilizing the through hole at the exterior of the rotor, the breach of the base, the gap between the base and the rotor, and the rotor with an air-guiding structure, the air flow is driven for dissipating the heat when the rotor rotates. In addition, the two opposite sides of the flange of the base are in communication with each other through the breach. When the motor is assembled to the installation element via the flange, the two opposite sides of the installation element are also in communication with each other through the breach. Therefore, the heat-dissipating effect of the motor of the present disclosure is significantly improved.

While the disclosure has been described in terms of what is presently considered to be the most practical and preferred embodiments, it is to be understood that the disclosure needs not be limited to the disclosed embodiment.

What is claimed is:

1. A motor comprising:
   a stator having a base and a coil mounted on the base; and
   a rotor sleeved on the stator and rotating along an axis, wherein the rotor comprises a hub, a plurality of air-guiding members extended toward a direction away from the axis are annularly disposed on the hub, the plurality of air-guiding members are connected to each other through a connecting rim, and a through hole is formed between two adjacent air-guiding members and the connecting rim;
   wherein the base comprises a flange and a cylinder, and the flange is disposed on a side of the cylinder neighboring to the rotor;
   a breach disposed on the periphery of the flange; and
   an installation element having a first side and a second side opposite to the first side, wherein the first side is abutted against the flange,
   wherein a plurality of second fins are disposed in the breach,
   wherein via the breach, a second heat-dissipating flow flows from the second side to the first side of the installation element passing through the second fins, then, the second heat-dissipating flow flows out of the breach or passes through the through hole.

2. The motor according to claim 1, wherein the breach is extended to the cylinder toward the direction away from the rotor.

3. The motor according to claim 1, wherein the flange comprises a first surface and first fins convexly disposed on the first surface and extended toward the direction away from the axis, and a first gap is formed between two adjacent first fins.

4. The motor according to claim 3, wherein the first fins are partially exposed at the outside of the connecting rim and are partially exposed at the inside of the connecting rim at the direction of the axis.

5. The motor according to claim 3, wherein the connecting rim is disposed at an end of the air-guiding members neighboring to the first fins.

6. The motor according to claim 1, wherein the connecting rim comprises a ring part and a connecting part, and the ring part connects the plurality of air-guiding members.

7. The motor according to claim 6, wherein the connecting part connects the hub and the ring part.

8. The motor according to claim 2, wherein the flange forms a first recess at the breach, and the cylinder forms a second recess at the breach.

9. The motor according to claim 8, wherein a slope is formed at an adjacency of the breach and the cylinder.

10. The motor according to claim 1, wherein the installation element has an opening, and the cylinder of the motor is located in the opening.

11. The motor according to claim 10, wherein the first side and the second side are in communication with each other through the breach.

12. The motor according to claim 11, wherein the plurality of second fins are exposed to the first side and the second side simultaneously.

13. A motor comprising:
    a stator having a base and a coil mounted on the base;
    a rotor sleeved on the stator and rotating along an axis, wherein the rotor comprises a hub, a plurality of air-guiding members are disposed on the periphery of the hub, an end of the plurality of air-guiding members are connected to each other through a connecting rim, and a through hole is formed among two adjacent air-guiding members and the connecting rim; and
    the base comprising a flange and a cylinder, wherein the flange is disposed on a side of the cylinder neighboring to the rotor, and a plurality of first fins are disposed on the flange;
    wherein relative to the connecting rim and the flange respectively, an extension direction of the plurality of air-guiding members is the same as that of the plurality of first fins,
    wherein the motor comprises a breach disposed on the periphery of the flange and a plurality of second fins disposed in the breach.

14. The motor according to claim 13, wherein the breach partially is extended to the cylinder.

15. A motor comprising:
    a stator having a base and a coil mounted on the base;
    a rotor sleeved on the stator and rotating along an axis, wherein the rotor comprises a hub, a plurality of air-guiding members are disposed on the periphery of the hub, an end of the plurality of air-guiding members are connected to each other through a connecting rim, and a through hole is formed among two adjacent air-guiding members and the connecting rim; and the base comprising a flange and a cylinder, wherein the flange is disposed on a side of the cylinder neighboring to the rotor, wherein the motor comprises a breach disposed on the periphery of the flange and a plurality of second fins disposed in the breach.

16. The motor according to claim 15, wherein a plurality of first fins are disposed on the flange.

* * * * *